(12) United States Patent
Sorrentino et al.

(10) Patent No.: US 9,554,340 B2
(45) Date of Patent: Jan. 24, 2017

(54) CLOSED LOOP POWER CONTROL COMMANDS FOR SRS

(71) Applicant: Telefonaktiebolaget L M Ericsson (publ), Stockholm (SE)

(72) Inventors: Stefano Sorrentino, Solna (SE); Mattias Frenne, Uppsala (SE); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 517 days.

(21) Appl. No.: 13/818,508

(22) PCT Filed: Jan. 21, 2013

(86) PCT No.: PCT/SE2013/050040
§ 371 (c)(1),
(2) Date: Feb. 22, 2013

(87) PCT Pub. No.: WO2013/119167
PCT Pub. Date: Aug. 15, 2013

(65) Prior Publication Data
US 2014/0071903 A1 Mar. 13, 2014

Related U.S. Application Data

(60) Provisional application No. 61/596,443, filed on Feb. 8, 2012.

(51) Int. Cl.
*H04W 52/26* (2009.01)
*H04W 52/32* (2009.01)
(Continued)

(52) U.S. Cl.
CPC ........... *H04W 52/26* (2013.01); *H04W 52/325* (2013.01); *H04W 52/54* (2013.01); *H04W 52/146* (2013.01); *H04W 52/244* (2013.01)

(58) Field of Classification Search
CPC .............................. H04W 52/04; H04W 52/18
USPC ................................................... 370/328, 329
See application file for complete search history.

(56) References Cited

U.S. PATENT DOCUMENTS

| 2003/0016652 A1 | 1/2003 | Ma et al. |
| 2011/0038271 A1 | 2/2011 | Shin et al. |
(Continued)

FOREIGN PATENT DOCUMENTS

| WO | 2011078631 A2 | 6/2011 |
| WO | 2011155711 A2 | 12/2011 |
(Continued)

OTHER PUBLICATIONS

3rd Generation Partnership Project. 3GPP TS 36.212 V10.1.0 (Mar. 2011). 3rd Generation Partnership Project;Technical Specification Group Radio Access Network; Evolved Universal Terrestrial Radio Access (E-UTRA); Multiplexing and channel coding (Release 10). Mar. 2011.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

According to one aspect of the teachings herein, a set of rules for transmitting Downlink Control Information (DCI) messages containing Transmit Power Control (TPC) commands is known to a wireless communication network (10) and to any number of wireless devices (20) supported by network (10). A device (20) receiving a given TPC DCI message knows the uplink channel(s) to which the received TPC command(s) are to be applied based on interpreting the given TPC DCI message according to the known rules. The rules may be defined as internal within the DCI format, such as bits, states or code points. Additionally, or alternatively,
(Continued)

the rules may be defined according to external attributes for DCI message transmission, such as whether the DCI message is transmitted on a Physical Downlink Control Channel, "PDCCH" or on an enhanced PDCCH, "ePDCCH".

38 Claims, 7 Drawing Sheets

(51) Int. Cl.
*H04W 52/54* (2009.01)
*H04W 52/14* (2009.01)
*H04W 52/24* (2009.01)

(56) References Cited

U.S. PATENT DOCUMENTS

| | | | |
|---|---|---|---|
| 2011/0250899 A1* | 10/2011 | Vajapeyam et al. | 455/450 |
| 2011/0310818 A1 | 12/2011 | Lin et al. | |
| 2012/0129566 A1* | 5/2012 | Lee et al. | 455/522 |
| 2012/0208583 A1 | 8/2012 | Chung et al. | |
| 2013/0077571 A1* | 3/2013 | Papasakellariou et al. | 370/328 |
| 2014/0022961 A1* | 1/2014 | Park et al. | 370/280 |
| 2014/0056278 A1* | 2/2014 | Marinier et al. | 370/330 |
| 2014/0321406 A1* | 10/2014 | Marinier et al. | 370/329 |

FOREIGN PATENT DOCUMENTS

| | | |
|---|---|---|
| WO | 2011162661 A1 | 12/2011 |
| WO | 2012176154 A1 | 12/2012 |
| WO | 2012177207 A1 | 12/2012 |
| WO | 2013025144 A1 | 2/2013 |

OTHER PUBLICATIONS

3rd Generation Partnership Project. 3GPP TS 36.213 V10.1.0 (Mar. 2011). 3rd Generation Partnership Project; Technical Specification Group Radio Access Network; Evolved Universal Terrestrial Radio Access (E-UTRA); Physical layer procedures (Release 10). Mar. 2011.

3rd Generation Partnership Project. "SRS Transmission Power Control." 3GPP TSG RAN WG1 #68, R1-120180_R1-120183, Feb. 6-10, 2012, pp. 1-3, Dresden, Germany.

3rd Generation Partnership Project. 3GPP TS 36.211 V10.2.0 (Jun. 2011). 3rd Generation Partnership Project; Technical Specification Group Radio Access Network; Evolved Universal Terrestrial Radio Access (E-UTRA); Physical Channels and Modulation (Release 10). Jun. 2011, pp. 21-27.

3rd Generation Partnership Project. "Aspects on Distributed RRUs with Shared Cell-ID for Heterogeneous Deployments." 3GPP TSG-RAN WG1 #64, R1-110649, Feb. 21-25, 2011,Taipei, Taiwan.

3rd Generation Partnership Project. "Corrections to Rel-10 LTE-Advanced features in 36.213." 3GPP TSG-RAN Meeting #64, R1-111216, Feb. 21-25, 2011,Taipei, Taiwan.

3rd Generation Partnership Project. 3GPP TS 36.212 V10.4.0 (Dec. 2011). 3rd Generation Partnership Project;Technical Specification Group Radio Access Network; Evolved Universal Terrestrial Radio Access (E-UTRA); Multiplexing and channel coding (Release 10). Dec. 2012.

3rd Generation Partnership Project. "Enhancements for Uplink Power Control." 3GPP TSG RAN WG1 Meeting #67, R1-114393, Nov. 14-18, 2011, San Francisco, USA.

3rd Generation Partnership Project. 3GPP TS 36.213 V10.4.0 (Dec. 2011). 3rd Generation Partnership Project; Technical Specification Group Radio Access Network; Evolved Universal Terrestrial Radio Access (E-UTRA); Physical layer procedures (Release 10). Dec. 2011.

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.2.0, Feb. 2013, 1-82.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.2.0, Feb. 2013, 1-170.

* cited by examiner

Table X

| TPC Command Field in DCI format 3 | Accumulated $\delta_{PUSCH,c}$ [dB] |
|---|---|
| 0 | -1 |
| 1 | 0 |
| 2 | 1 |
| 3 | 3 |

FIG. 7

Table Y

| TPC Command Field in DCI format 3A | Accumulated $\delta_{PUSCH,c}$ [dB] |
|---|---|
| 0 | -1 |
| 1 | 1 |

FIG. 8

CLOSED LOOP POWER CONTROL COMMANDS FOR SRS

RELATED APPLICATIONS

This application claims priority from the U.S. provisional patent application filed on 8 Feb. 2012 and assigned App. No. 61/596,443, and which is incorporated herein by reference.

TECHNICAL FIELD

The present invention generally relates to wireless communications, and particularly relates to closed-loop transmit power control.

BACKGROUND

The Long Term Evolution, "LTE", standard uses Radio Network Temporary Identifiers or "RNTIs" to identify individual and/or groups of user equipments, "UEs". A given UE may have multiple RNTIs active at any given time, e.g., for use in paging, random access, and uplink transmit power control.

In the case of uplink transmit power control, a network base station, referred to as an "eNodeB" in the LTE standard, sends Downlink Control Information or "DCI" messages that carry transmit power control, "TPC", commands. For example, so called Format 3/3A messages are used to convey TPC commands for Physical Uplink Control Channel, "PUCCH", transmissions by a UE, as well as TPC commands for Physical Uplink Shared Channel, "PUSCH", transmissions by the UE. Different RNTIs are used to indicate whether the TPCs pertain to PUCCH or PUSCH power control.

Within this framework, the UE ties its transmit power control of uplink Sounding Reference Signal, "SRS", transmissions to the TPC commands received for its PUSCH transmissions. In other words, LTE provides no mechanism for separately controlling the uplink transmit power of the SRS transmissions by a UE. Thus, SRS power control at the UE is made to depend on the network's closed-loop control of the UE's PUSCH transmit power, although the reception quality requirements and network reception points for PUSCH and SRS transmissions generally are different. These differences become particularly problematic in heterogeneous network environments where smaller cells, e.g., "pico" cells, associated with low-power access nodes overlay a larger, macro cell provided by an eNodeB or other relatively high-power access point.

SUMMARY

According to one aspect of the teachings herein, a set of rules for transmitting Downlink Control Information (DCI) messages containing Transmit Power Control (TPC) commands is known to a wireless communication network and to any number of wireless devices supported by network. A device receiving a given TPC DCI message knows the uplink channel(s) to which the received TPC command(s) are to be applied based on interpreting the given TPC DCI according to the known rules. The rules may be defined as internal within the DCI format, such as bits, states or code points. Additionally, or alternatively, the rules may be defined according to external attributes for DCI message transmission, such as whether the DCI message is transmitted on a Physical Downlink Control Channel, "PDCCH" or on an enhanced PDCCH, "ePDCCH".

In one example, a method of controlling Sounding Reference Signal, "SRS", transmission power by a wireless device operating in a Long Term Evolution, "LTE" network is in a base station in the LTE network. The method includes generating SRS TPC commands for controlling a transmit power of SRS transmissions by the wireless device, and generating Physical Uplink Shared Channel, "PUSCH", TPC commands or Physical Uplink Control Channel, "PUCCH", TPC commands, for controlling a transmit power of PUSCH or PUCCH transmissions by the wireless device. Further, the method includes sending first TPC DCI messages to the wireless device that include the SRS TPC commands and that are masked by a first Radio Network Temporary Identifier, "RNTI", and second TPC DCI messages to the wireless device that include the PUSCH or PUCCH TPC commands and are masked by the first RNTI, and correspondingly controlling whether any given TPC DCI message that is masked with the first RNTI is interpreted by the wireless device as being one of the first TPC DCI messages or as being one of the second TPC DCI messages, by sending the given TPC DCI message according to a first rule that is known to the wireless device or according to a second rule that is known to the wireless device.

Further on the network side, a base station configured to carry out the above method includes communication transceiver circuits that are configured to transmit downlink signals to a wireless device operating in the LTE network and receive uplink signals from the wireless device. The example base station further includes one or more processing circuits that are operatively associated with the communication transceiver circuits and configured to carry out the above method, e.g., via one or more fixed circuits, one or more programmed circuits, or a combination of both.

In an example of the device-side aspects of the teachings herein, a method is implemented at a wireless device that is configured for operation in an LTE network. The method includes receiving TPC DCI messages from a base station in the LTE network. These TPC DCI messages are masked by a first RNTI, and the method includes interpreting given ones of the TPC DCI messages as being first TPC DCI messages or as being second TPC DCI messages, based on whether the given TPC DCI messages were transmitted by the base station according to a first rule or according to a second rule. The first and second rules are known to the base station and to the wireless device, and the wireless device controls a transmit power of its SRS transmissions responsive to TPC commands conveyed in the first TPC DCI messages, and to control a transmit power of its PUSCH or PUCCH transmissions responsive to TPC commands conveyed in the second TPC DCI messages.

Correspondingly, an example wireless device includes communication transceiver circuits that are configured to receive downlink signals from a base station in an LTE network and to send uplink signals to the base station. Further, the wireless device includes one or more processing circuits that are operatively associated with the communication transceiver circuits and configured to carry out the above device-side method. The one or more processing circuits comprise fixed processing circuits, programmed processing circuits, or some combination of both.

BRIEF DESCRIPTION OF THE DRAWINGS

FIGS. 7 and 8 are example configuration tables for transmit power control at a wireless device.

DETAILED DESCRIPTION

Figure 1:
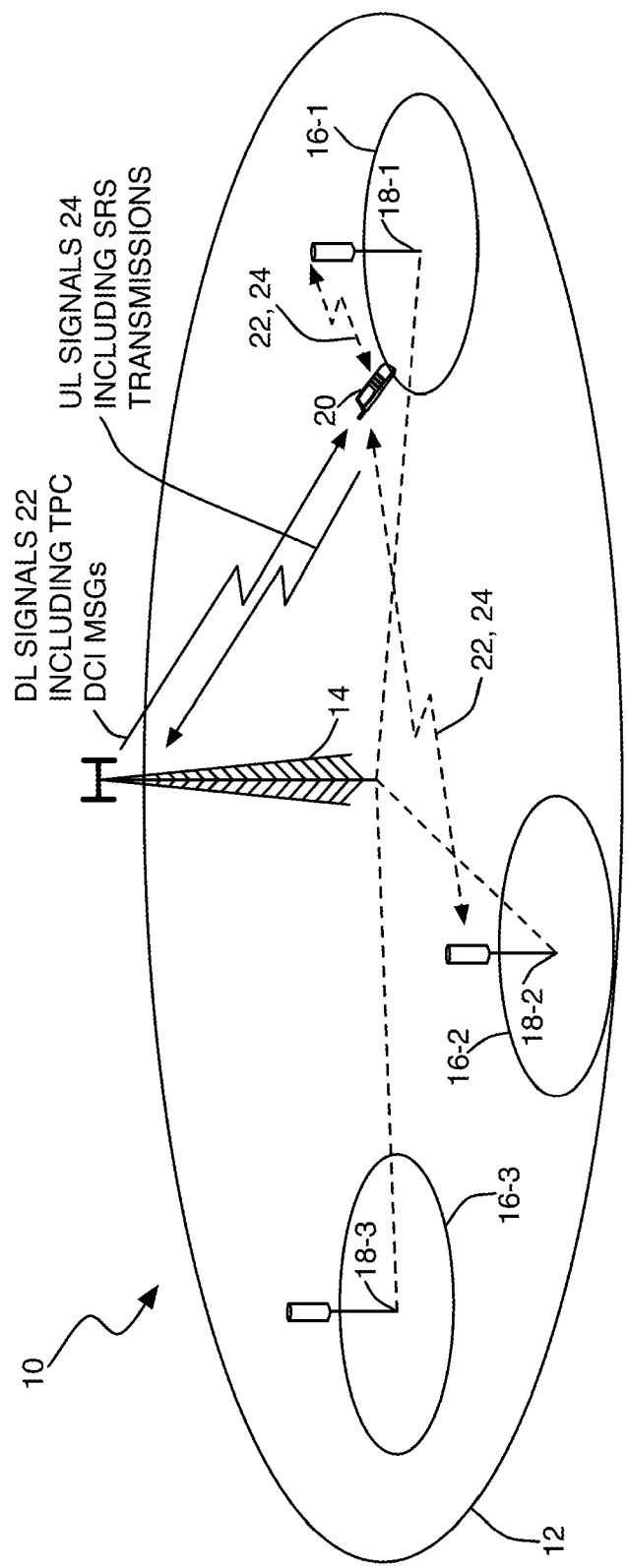
FIG. 1 is a block diagram of one embodiment of a wireless communication network, including one or more base stations and a wireless device that are configured according to the teachings herein.

FIG. 1 illustrates a wireless communication network 10 that provides communication services in a cell 12 that is associated with a base station 14. Additional cells 16-1, 16-2 and 16-3 may partially or fully overlap the cell 12, with each such cell 16 being served by a respective base station 18, e.g., the base station 18-1 is associated with the cell 16-1, the base station 18-2 is associated with the cell 16-2, and so on. While the illustrated arrangement corresponds to a heterogeneous network example, where the cell 12 has a larger coverage area than the cells 16, e.g., where the cell 12 is a "macro" cell overlaid by one or more "pico" cells, the teachings herein are not so limited. That is, the teachings herein apply to heterogeneous network arrangements where the base station 14 is a macro or high-power base station and the base stations 18 are low-power or micro/pico/femto base stations, and also to homogeneous network arrangements where the base stations 14 and 18 are of the same type, or where the network 10 includes base stations of only one type 14 or 18.

The term "base station" also should be understood to encompass essentially any type of access point or node in the network 10 that functions as a receiver, transmitter or transceiver. When referring to any of the base stations 14 or 18 in the singular or plural senses, this disclosure uses the terms "base station 14, 18" or "base stations 14, 18". In this regard, one sees a wireless device 20, which is configured according to the device-side teachings herein, and which receives downlink, "DL", signals 22 from one or more base stations 14, 18, and which transmits uplink, "UL", signals 24 to one or more base stations 14, 18.

The network 10 comprises, for example, a Long Term Evolution or LTE network, and the base stations 14, 18 are configured for operation in the LTE network, as is the wireless device 20. In actuality, there may be many more cells 12, 16 and base stations 14, 18, and the network 10 may include core network and other nodes/entities that are not illustrated, and may support a large number of wireless devices 20, which may be items of user equipment or "UEs" in the parlance of the Third Generation Partnership Project or the 3GPP as it is more conveniently known.

Figure 2:
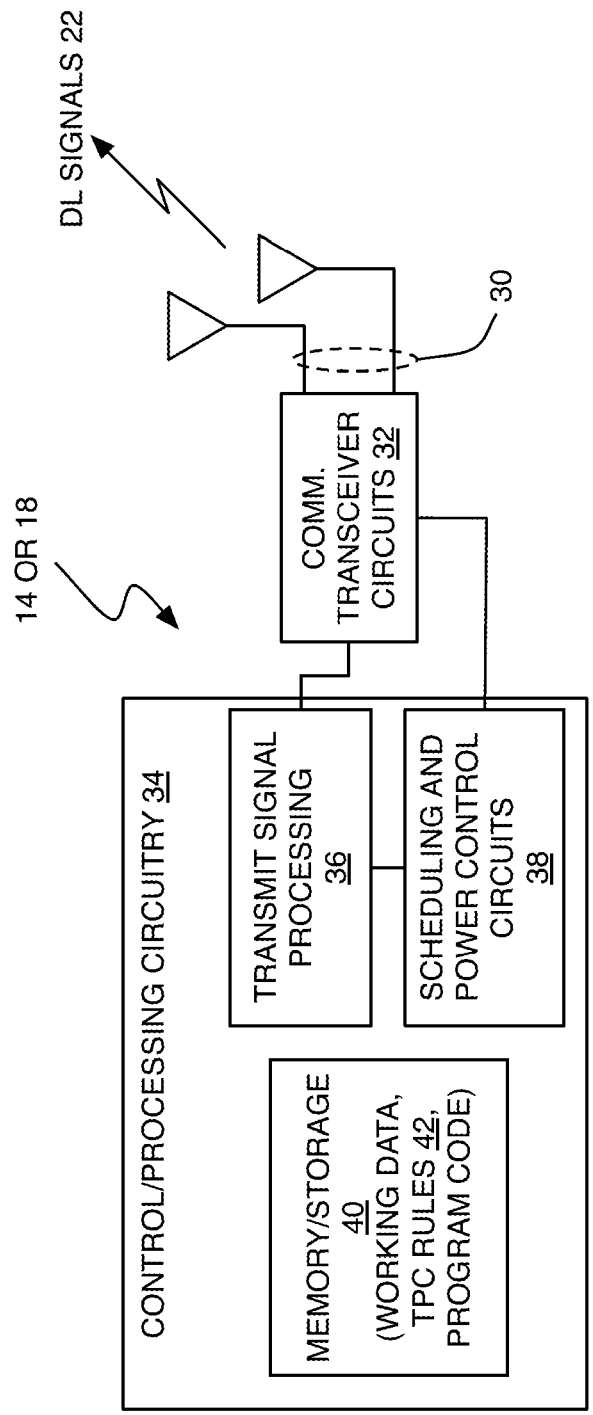
FIG. 2 is a block diagram of one embodiment of a base station, such as may be used in the network of FIG. 1.

FIG. 2 provides example details for any given one of the base stations 14, 18. The illustrated base station 14, 18 includes one or more transmit/receive antennas 30 and associated communication transceiver circuits 32 that are configured to transmit downlink signals 22 to a wireless device 20 operating in the network 10, and to receive uplink signals 24 from the wireless device 20. Further, the base station 14, 18 includes control/processing circuitry 34, which are hereafter referred to as "the one or more processing circuits 34" or simply as "the processing circuits 34".

In an example embodiment, the base station 14, 18 is an eNB in an LTE Radio Access Network or "RAN", and the processing circuits 34 include fixed and/or programmable circuitry that is configured to implement network-side aspects of the uplink power control and DCI signalling as disclosed herein. The processing circuits 34 store rules for how power control information transmitted in certain DCI signalling is to be processed/interpreted at the wireless device 20. Broadly, the processing circuit(s) 34 comprise one or more digital processing circuits—e.g., one or more microprocessors, microcontrollers, DSPs, FPGAs, etc.

In particular, the base station 14, 18 may include a chassis having one or more backplanes or other such interfaces that support different sets of installed processing cards that provide call control and signalling support for the various types of call/data connections provided via the network 10. Such circuitry includes or is associated with memory/storage (one or more types of computer-readable medium) that stores a computer program comprising program instructions that cause the base station 14, 18 to carry out at least a portion of the network-side uplink power control method(s) taught herein, when those program instructions are executed by the processing circuit(s) 34.

In that regard, the processing circuits 34 are operatively associated with the communication transceiver circuits 32, and may include transmit signal processing circuits 36, scheduling and power control circuits 38, and memory/storage 40, which may hold working data, such as program code and a data structure embodying the rules for interpreting TPC commands sent in DCI messages, as taught herein. The processing circuits 34 are configured to generate SRS TPC commands for controlling a transmit power of SRS transmissions by the wireless device 20—and/or any number of other wireless devices 20—and to generate PUSCH or PUCCH TPC commands, for controlling transmit powers of PUSCH or PUCCH transmissions by the wireless device 20.

Further, in accordance with the rule examples taught herein, the processing circuits 34 are configured to send—i.e., via the communication transceiver circuits 32—first TPC Downlink Control Information, "DCI" messages to the wireless device 20 that include the SRS TPC commands and that are masked by a first RNTI, and send second TPC DCI messages to the wireless device 20 that include the PUSCH or PUCCH TPC commands and that are masked by the first RNTI. That is, the processing circuits 34 are configured to control whether the wireless device 20 interprets any given TPC DCI message that is masked with the first RNTI as being one of the first TPC DCI messages for SRS TPC or as being one of the second TPC DCI message for PUSCH or PUCCH TPC, by sending the given TPC DCI message according to a first rule that is known to the wireless device 20 or according to a second rule that is known to the wireless device 20.

In an example, the second TPC DCI messages include the PUSCH TPC commands, such that any given TPC DCI message that is masked with the first RNTI controls the transmit power of SRS transmissions by the wireless device 20, if the given TPC DCI message is sent according to the first rule, and controls the transmit power of PUSCH transmissions by wireless device 20 if the given TPC DCI message is sent according to the second rule.

This control scheme may be extended, such as where the processing circuits 34 are configured to send third TPC DCI messages to the wireless device 20 that include the PUCCH TPC commands and that are masked with a second RNTI that is known to the wireless device 20 as being allocated to PUCCH TPC. That is, in some embodiments, the base station 14, 18 is configured to control the transmit power of PUCCH transmissions by the wireless device 20 by including PUCCH TPC commands in given TPC DCI messages that are masked with the second RNTI, to control the transmit power of SRS transmissions by the wireless device 20 by including SRS TPC commands in given TPC DCI messages that are masked with the first RNTI and transmitted according to the first rule, and to control the transmit power of PUSCH transmissions by the wireless device 20 by including PUSCH TPC commands in given TPC DCI messages that are masked with the first RNTI and transmitted according to the second rule.

The processing circuits 34 include or are associated with a computer-readable medium, e.g., the memory/storage 40, which stores a data structure 42 defining the first and second rules in terms of at least one of the following distinctions: which LTE subframes or frames are used to send a given TPC DCI message that is masked with the first RNTI; which Physical Downlink Control Channel, "PDCCH", or enhanced PDCCH, "ePDCCH", allocations or configurations are used to send the given TPC DCI message; whether the given TPC DCI message is sent from a common or device-specific search space in an ePDCCH; whether the given TPC DCI message is sent on a PDCCH or an ePDCCH; whether the given TPC DCI message is sent on an ePDCCH using localized or distributed transmission; whether a DCI search space of the wireless device 20 includes one or both of a PDCCH and an ePDCCH transmission for the wireless device 20; whether there is a Reference Signal, "RS", symbol in a last OFDM symbol of a corresponding uplink subframe; and what states or conditions are taken on by carrier indicator field bits in the given TPC DCI message.

In one example configuration, the computer-readable medium stores a data structure 42 defining the first and second rules, and wherein the first rule is that a first defined subset of subframes as defined by the LTE air interface are used for transmission of the first TPC DCI messages and that one or more of the remaining subframes are used for transmission of the second TPC DCI messages. According to this definition of the rules, given TPC DCI messages masked with the first RNTI and sent in any of the subframes within the first defined subset are interpreted by the base station 14, 18 and the wireless device 20 as given ones of the first TPC DCI messages for SRS TPC, and are otherwise interpreted as given ones of the second TPC DCI messages for PUSCH or PUCCH TPC.

The processing circuits 34 also may be configured to separately control transmit powers of aperiodic and periodic SRS transmissions by the wireless device 20, based on being configured to: generate the SRS TPC commands as first SRS TPC commands for controlling the periodic SRS transmissions by the wireless device 20 and as second SRS TPC commands for controlling the aperiodic SRS transmissions by the wireless device 20; and send the first SRS TPC commands in the first TPC DCI messages, which are sent according to the first rule, and send the second TPC commands in fourth DCI messages, which are masked with the first RNTI but which are sent according to a third rule known to the base station 14, 18 and to the wireless device 20. Here, the third rule distinguishes the fourth TPC DCI messages from the first TPC DCI messages.

Figure 3:
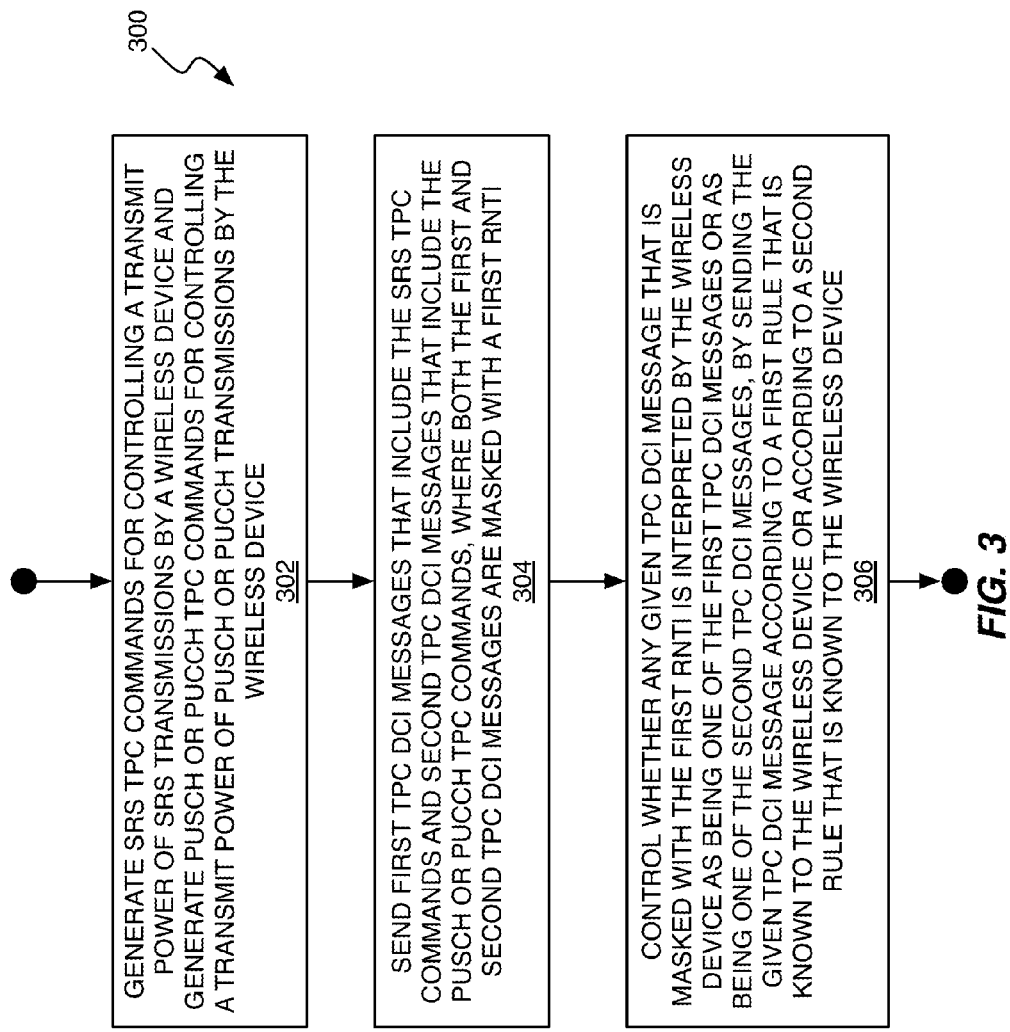
FIG. 3 is a logic flow diagram of one embodiment of a method of processing, such as may be implemented in the base station of FIG. 2.

FIG. 3 illustrates a method 300 representative of the above base station processing. As such, the method 300 allows a base station 14, 18 to control SRS transmission power by a wireless device 20 operating in an LTE network, such as network 10.

The method 300 includes the base station 14, 18 generating SRS TPC commands for controlling a transmit power of SRS transmissions by the wireless device 20, and generating PUSCH TPC commands or PUCCH TPC commands for controlling a transmit power of PUSCH or PUCCH transmissions by the wireless device 20 (Block 302). Further, the method 300 includes sending first TPC DCI messages to the wireless device 20 that include the SRS TPC commands and that are masked by a first RNTI, and sending second TPC DCI messages to the wireless device 20 that include the PUSCH or PUCCH TPC commands and that are masked by the first RNTI (Block 304).

Correspondingly, the method 300 includes controlling whether any given TPC DCI message that is masked with the first RNTI is interpreted by the wireless device 20 as being one of the first TPC DCI messages or as being one of the second TPC DCI messages, based on sending the given TPC DCI message according to a first rule that is known to the wireless device 20 or according a second rule that is known to the wireless device 20 (306). That is, if the given TPC DCI message is sent according to the first rule, it is interpreted as being for SRS power control, and if the given TPC DCI message is sent according to the second rule it is interpreted as being for PUSCH or PUCCH power control. This arrangement is advantageous because the same RNTI can be used to send TPC commands for different physical channels, where the rule by which the TCP DCI message is sent determines the channel targeted by the TPC commands included in the TCP DCI message.

Figure 4:
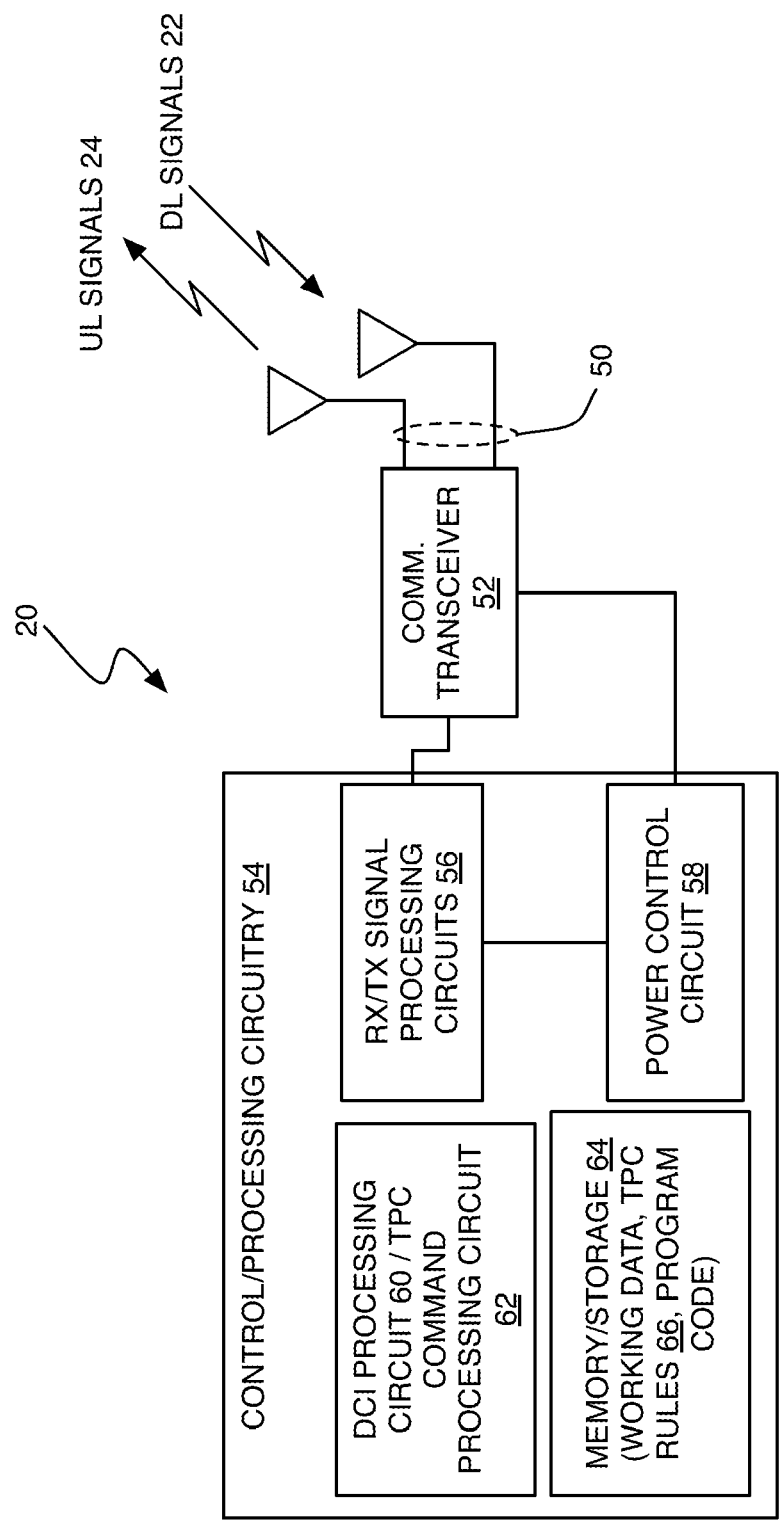
FIG. 4 is a block diagram of one embodiment of a wireless device, such as may be used in the network of FIG. 1.

Turning to the device-side aspects of the teachings herein, FIG. 4 illustrates a UE or other type of wireless device 20, which includes one or more transmit/receive antennas 50 and an associated communication transceiver 52, e.g., a radio transceiver configured to operate in an LTE network. The wireless device 20 further includes control/processing circuitry 54, which is hereafter referred to as "the one or more processing circuits 54" or simply as "the processing circuits 54".

In an example embodiment, the processing circuits 54 comprise fixed and/or programmable circuitry that is configured to implement uplink power control as disclosed herein. In one example embodiment, the processing circuits 54 comprise one or more digital processing circuits—e.g., microprocessor, microcontroller, DSP, FPGA, etc. Such circuitry may be configured as receive/transmit, "RX/TX", processing circuits 56, a power control circuit 58, a DCI processing circuit 60, which includes or is associated with a TPC command processing circuit 62. The processing circuits 54 also may include memory/storage 64, or another computer-readable medium, storing working data, TPC rules 66, and computer program instructions comprising computer code that, when executed by the processing circuits 54, cause the processing circuits 54 to operate according to the device-side teachings herein.

The TPC rules 66 may be understood as a copy of the TPC rules 42 stored in the base station 14, 18 shown in FIG. 2, and they will be appreciated as processing rules used by the wireless device 20 to process DCI information for the power control method(s) taught herein—i.e., to control how the wireless device 20 interprets the TPC commands received in a given TPC DCI message sent to it, in dependence on the rule by which such message was sent. It will also be appreciated that the TPC rules 42, 62 may be parameterized as taught herein.

Note that the above described circuitry also may be referred to as "units," e.g., "processing units," "control units," etc. The same is true, by the way, for the base station 14, 18. Regardless of the terminology, in at least one embodiment, the DCI processing circuit 60 is configured to interpret received DCI messages, and the TPC command processing circuit 62 is configured to process or otherwise apply received TPC commands to the targeted uplink channel, as determined by the DCI processing circuit 60 using the rule-based interpretation herein. The processing and application of TPC commands is accomplished via that power control circuit 58, for example, which is configured to adjust the uplink transmit power of the wireless device 20 on any one or more of the channels being closed-loop power controlled by the network 10.

However organized in terms of physical and/or functional processing units, the processing circuits 54 of the wireless device 20 are configured to receive TPC DCI messages from a base station 14, 18, wherein the TPC DCI messages are masked by a first RNTI. Advantageously, the processing circuits 54 are configured to interpret given ones of the TPC DCI messages as being first TPC DCI messages or as being second TPC DCI messages, based on whether the given TPC DCI messages were transmitted by the base station 14, 18 according to a first rule or according to a second rule. The first and second rules, e.g., the TPC rules 42 at the base station 14, 18 and the TPC rules 66 at the wireless device 20, are known to the base station 14, 18 and to the wireless device 20.

According to this arrangement, the processing circuits 54 are configured to control a transmit power of SRS transmissions by the wireless device 20 responsive to TPC commands conveyed in the first TPC DCI messages, and to control a transmit power of PUSCH or PUCCH transmissions by the wireless device 20 responsive to TPC commands conveyed in the second TPC DCI messages.

In an example configuration, the second TPC DCI messages include PUSCH TPC commands, and the processing circuits 54 are configured to control the transmit power of the SRS transmissions responsive to the SRS TPC commands in the first TPC DCI messages, and to control the transmit power of the PUSCH transmissions responsive to the PUSCH TPC commands in the second TPC DCI messages. This arrangement may be extended. For example, the processing circuits 54 are configured to receive additional TPC DCI messages that include PUCCH TPC commands and that are masked with a second RNTI that is known to the wireless device 20 as being allocated to PUCCH TPC. The processing circuits 54 interpret these additional TPC DCI messages as third TPC DCI messages, and control a transmit power of PUCCH transmissions by the wireless device 20 responsive to PUCCH TPC commands in the third TPC DCI messages.

Figure 6:
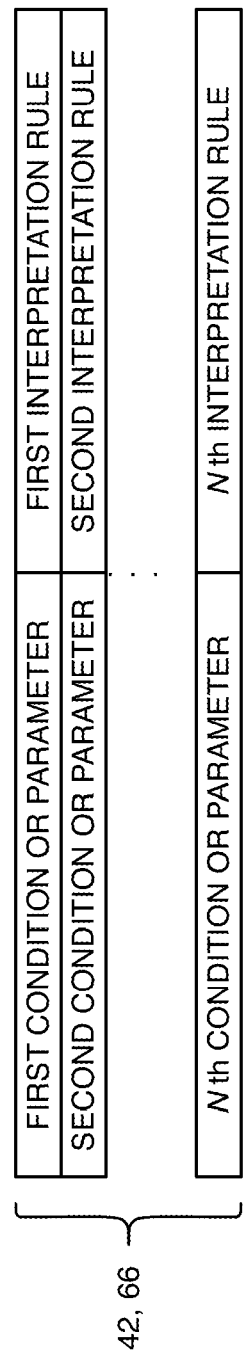
FIG. 6 is a diagram of a data structure that maps or associates different conditions or parameters for sending Downlink Control Information messages with different rules for interpreting how to apply Transmit Power Control commands carried in those messages.

As noted the device-side TPC rules 66 may be a literal or at least functionally-equivalent copy of the network-side TPC rules 42, such that there is an agreement between the network 10 and the wireless device 20 as to how given TPC commands in a given TPC DCI message will be interpreted and applied at the wireless device 20. Jumping ahead momentarily, FIG. 6 suggests a data structure for representing the TPC rules 42 and 66 as defined mappings between conditions and/or parameters associated with the transmission of TPC DCI messages and corresponding rules for how the conveyed TPC commands are to be interpreted and applied at the targeted wireless device(s) 20.

In some embodiments, the first and second rules embodied in the TPC rules 42 and 66 are commonly defined in terms of at least one of the following distinctions: (a) which LTE subframes or frames are used to send a given TPC DCI message that is masked with the first RNTI; (b) which PDCCH or ePDCCH allocations or configurations are used to send the given TPC DCI message; (c) whether the given TPC DCI message is sent from a common or a device-specific search space in an ePDCCH; (d) whether the given TPC DCI message is sent on a PDCCH or on an ePDCCH; (e) whether the given TPC DCI message is sent on an ePDCCH using a localized or distributed transmission; (f) whether a DCI search space of the wireless device 20 includes one or both of a PDCCH and an ePDCCH transmission for the wireless device 20; (g) whether there is a Reference Signal, "RS", symbol in a last OFDM symbol of a corresponding uplink subframe; (h) and what states or conditions are taken on by carrier indicator field bits in the given TPC DCI message.

In an example definition of the rules, the first rule is that a first defined subset of subframes as defined by the LTE air interface is used for transmission of the first TPC DCI messages and that one or more of the remaining subframes are used for transmission of the second TPC DCI messages. With this definition of the TPC rules 42 and 66, given TPC DCI messages that are masked with the first RNTI and sent in any of the subframes within the first defined subset are interpreted by the wireless device 20 as given ones of the first TPC DCI messages for SRS TPC, and are otherwise interpreted as given ones of the second TPC DCI messages for PUSCH or PUCCH TPC.

The processing circuits 54 also may be configured to separately control transmit powers of aperiodic and periodic SRS transmissions at the wireless device 20 based on: interpreting given ones of the TPC DCI messages as being first or fourth DCI messages based on whether the base station 14, 18 sent the given TPC DCI messages according to the first rule or according to a third rule that is known to the wireless device 20. In such configurations, the processing circuits 54 control a transmit power of periodic SRS transmissions by the wireless device 20 responsive to TPC commands conveyed in the first TPC DCI messages, and control a transmit power of aperiodic SRS transmissions by the wireless device 20 responsive to TPC commands conveyed in the fourth TPC DCI messages.

Figure 5:
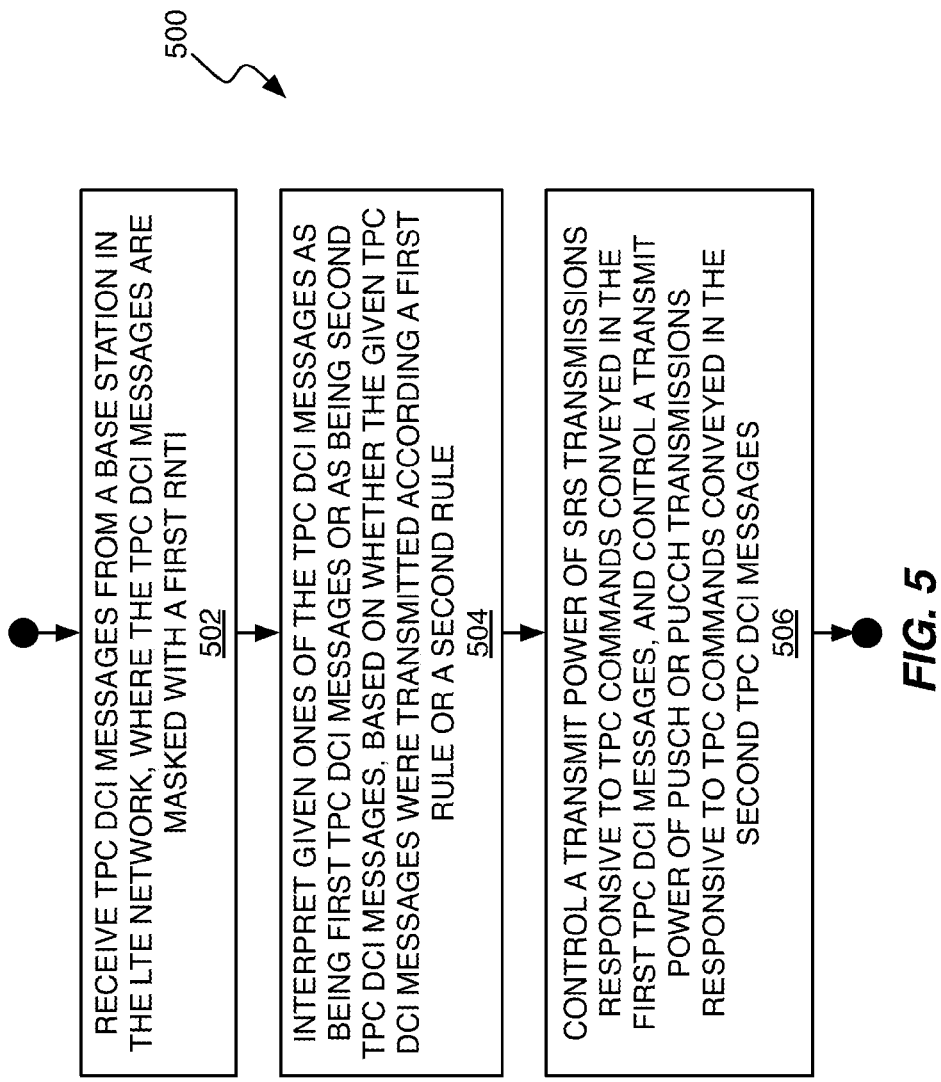
FIG. 5 is a logic flow diagram of one embodiment of a method of processing, such as may be implemented in the wireless device of FIG. 4.

FIG. 5 illustrates a device-side method, such as is implemented in the wireless device 20 depicted in FIG. 4 and described above. According to the depicted example, the method 500 includes receiving TPC DCI messages from a base station 14, 18 in the network 10 (Block 502). The TPC DCI messages are masked by a first RNTI, and the method 500 includes the wireless device 20 interpreting given ones of the TPC DCI messages as being first TPC DCI messages or as being second TPC DCI messages, based on whether the given TPC DCI messages were transmitted by the base station 14, 18 according to a first rule or according to a second rule (Block 504). This interpretation can be understood as being dynamic or on-the-fly, and it advantageously allows the network 10 to use the same RNTI to mask different TCP DCI messages targeted to the closed-loop power control of different uplink channel at the wireless device 20, simply by using different rules to send the different TCP DCI messages.

The first and second rules are known to the base station 14, 18 via the TCP rules 42, and to the wireless device 20 via the TCP rules 66, and the method 500 further includes the wireless device 20 controlling a transmit power of its SRS transmissions responsive to TPC commands conveyed in the first TPC DCI messages, and controlling a transmit power of its PUSCH or PUCCH transmissions responsive to TPC commands conveyed in the second TPC DCI messages (Block 506). In at least one case, the first rule is used to identify TPC commands targeted to the SRS transmissions by the wireless device 20, and the second rule is used to identify TPC commands targeted to the PUSCH transmissions by the wireless device 20, even though the same RNTI is used for masking the TPC DCI messages sent according to both rules. A third rule and/or a different RNTI may be used to send TPC DCI messages targeted to closed-loop control of PUCCH transmissions by the wireless device 20.

In one approach, TPC commands intended for closed-loop power control of the SRS transmission are transmitted by the network 10 in only a subset of recurring subframes. The subset, for example, could be either a subframe that schedules a PUSCH transmission or a downlink subframe that has an associated HARQ-ACK transmission that may use PUCCH.

PUCCH in a subframe that is part of the cell-specific SRS set, or a subframe where the wireless device 20 is supposed to transmit an SRS, or a subframe that is indicated as being part of the device's aperiodic SRS set.

More generally, the interpretation of TPC commands in a DCI message according to the corresponding rule by which the TPC DCI message was sent can be understood as representing a dynamic interpretation of bits, states or code points in certain DCI formats and/or the dynamic interpretation of the transmission parameters, timing, or conditions of the DCI message, as discussed earlier herein. Regardless, according to predefined TPC rules 42 and 66 shared by the network 10 and the wireless device 20, selected bits, states or code points in the DCI message and/or selected parameters associated with transmission of the message control how TPC commands in the message are interpreted and applied as closed-loop power control commands for PUCCH, SRS or PUSCH, respectively.

As noted elsewhere herein, the above mentioned rules may be based on a number of parameter or conditions for the transmission of the TPC DCI messages such as any one or more of the following examples: the subframe index within a frame, the frame index, the index of the first Control Channel Element or "CCE" or eCCE used for a PDCCH or ePDCCH transmission, the aggregation level of the PDCCH or ePDCCH for the corresponding DCI format, whether the PDCCH or ePDCCH is used for the transmission, whether an ePDCCH transmission is of localized or distributed type, whether the ePDCCH transmission use a device-specific RS or a group-specific RS, in which case the RS for demodulation is shared by at least two ePDCCH transmissions in the subframe, the frequency domain position for the downlink control channel for either PDCCH or ePDCCH, whether the device search space contains both PDCCH and ePDCCH transmissions or only one of them, whether there is an SRS symbol in the last OFDM symbol of the corresponding uplink subframe, and/or the bits, states or code points within the TPC DCI message itself, such as the carrier indicator field bits.

In one example, a subset of the bits that are nominally assigned to either PUSCH or PDCCH closed-loop power control are used for SRS closed-loop power control whenever a trigger event defined by the above rule occurs. An another alternative is that in case the base station 14, 18 triggers an aperiodic SRS in the same uplink grant or downlink assignment, the TPC commands received in a DCI message are reinterpreted so that a subset or all of the TPC command bits are for SRS power control and any remaining TPC command bits are for either PUSCH or PUCCH power control, depending on whether the DCI message is a downlink assignment or an uplink grant. The wireless device 20 would apply the corresponding TPC commands as interpreted from the corresponding subset of TPC command bits for each specific channel and signal.

In yet another alternative, the network 10 and the wireless device 20 use a separate closed-loop power control for aperiodic SRS transmissions, and use the same closed-loop power control for periodic SRS transmissions—e.g., SRS power control at the wireless device 20 follows the closed-loop PUSCH power control. In such a case, the TPC commands received at the wireless device 20 for SRS power control are applied only to the aperiodic SRS transmissions by the wireless device 20. In a similar example, the base station 14, 18 may utilize a set of bits that are associated with triggering aperiodic SRS, to indicate closed-loop TPC commands for the SRS. The wireless device 20 would then apply these TPC commands for either aperiodic SRS transmissions, periodic SRS transmissions, or both.

In another example, the wireless device 20 is configured with a cross-carrier indicator field or "CIF", where the interpretation of a subset or all of the bits associated with the cross-carrier indicator field is changed, so that they indicate TPC commands for SRS power control. For example, one bit in the cross-carrier indicator field could be allocated for use in SRS power control, while two bits in the field are used to indicate which cell 12, 16 in the network 10 is the scheduled cell for the wireless device 20. Of course, a different number of bits may be allocated for indicating TPC commands for SRS power control.

Further, whether the CIF contains TPC commands for SRS power control could depend on whether the base station 14, 18 triggers an aperiodic SRS in the same transmission, whether the scheduled subframe is a subframe with an SRS transmission in it, whether the scheduled subframe could potentially contain an SRS transmission by the wireless device 20, or whether the scheduled subframe is part of the cell-specific SRS subframes.

In another example, the "mapping" rule that governs which channel(s) are targeted by TPC commands in a given TPC DCI message consists of a pattern indicating that for some subframes within a frame, at least a subset of the TPC command bits in the downlink and/or uplink DCI formats are interpreted as SRS power control bits, while for the remaining subframes the bits in the downlink DCI formats are interpreted as PUCCH and/or PUSCH power control bits. The mapping rule in such an embodiment can be understood as a pattern, which pattern may be signalled by the network 10 to the wireless devices 20 in a semi-static fashion.

In another example, the mapping rule comprises a pattern indicating that for some subframes within a frame, at least a subset of the TPC command bits in the TCP DCI messages (e.g., DCI format 3/3A messages in LTE Rel-8) are interpreted as SRS power control bits, while for the remaining subframes, the bits in the TPC DCI messages are interpreted as PUCCH and/or PUSCH power control bits, according to existing protocols.

In another example the mapping rule comprises is based on the interpretation of at least a subset of the power control bits in the TPC DCI messages as a function of the CCE position (e.g. of the first CCE used for the PDCCH or first eCCH used by a ePDCCH) of such DCI formats in the PDCCH/ePDCCH mapping. For example, the mapping rule comprises a pattern that is indicated by the network 10 to the wireless devices 20 in a semi-static fashion. Based on such patterns and the CCE associated with a given DCI format, it is possible for any given wireless device 20 to identify whether the TPC command bits present in such a given TPC DCI message should be interpreted as PUCCH, PUSCH or SRS power control bits.

Such operation may be extended further by including the subframe index within a frame as part of the mapping rule. In such an extension, the interpretation of the power control bits in a given DCI format depends on both the subframe index and the CCE or eCCE associated with the DCI format.

In another example, the mapping rule is based on different attributes of an ePDCCH transmission, possibly in relation to a PDCCH transmission. For example, where a wireless device 20 is configured to monitor a search space in both PDCCH and ePDCCH, it is possible for the wireless device 20 to identify whether TPC commands received in a given TPC DCI message should be interpreted as PUCCH, PUSCH or SRS power control bits, based on where in the search space the wireless device 20 detects the DCI message.

In a further alternative of the previous example, the wireless device 20 bases the determination of whether the power bits present in a given TCP DCI message should be interpreted as PUCCH, PUSCH or SRS power control bits in dependence on whether the ePDCCH is received as a localized transmission or as a distributed transmission.

In yet an additional alternative of the previous example, the wireless device 20 bases the determination of whether the TPC command(s) present in TCP DCI message should be interpreted as PUCCH, PUSCH or SRS power control bits in dependence on whether the ePDCCH is received with device-specific RS or group-specific RS.

In yet another alternative of the previous example, the wireless device 20 bases determination of whether the TPC command(s) present in a given TPC DCI message should be interpreted as PUCCH, PUSCH or SRS power control bits depending on whether the ePDCCH is received with a rank 1 transmission, e.g. beamforming, or with a transmit diversity scheme.

In another alternative, the wireless device 20 monitors a specific RNTI for DCI format 3/3A and a corresponding index within DCI format 3/3A to indicate power control bits for SRS.

It also follows that the wireless device 20 may use the RNTI for either PUCCH or PUSCH when monitoring DCI format 3/3A for power control bits, but the wireless device 20 is configured with a specific index that points towards the bits that are only used for power control of its SRS transmissions. For example, RRC can be used to configure the RNTI and/or the index to be used by the wireless device 20 to identify those power control bits targeted to SRS power control.

The number of bits a given wireless device 20 monitors within DCI format 3/3A message can vary depending on which DCI format the wireless device 20 is configured to received. For example, if the wireless device 20 is configured with DCI format 3, it monitors two bits for SRS power control, and if the wireless device 20 is configured to receive DCI format 3A it monitors 1 bit of SRS power control. The power control command the bits indicate could be any specific value. For example, for a format 3 DCI message, the wireless device 20 might be configured to have the control configuration shown in Table X of FIG. 7. For a format 3A DCI message, the wireless device 20 could be configured to have the control configuration shown in Table Y in FIG. 8.

If only a fraction of the bits in a TPC DCI message is employed for PUSCH, SRS and/or PUCCH power control, as compared to the nominal number of bits for conventional power control, the steps corresponding to the transmit power control correction are mapped to the available number of bits according to a predefined mapping rule which is shared between the network 10 and the wireless device 20.

With the above examples in mind, it will be appreciated that the teachings herein enable independent power control for PUCCH, PUSCH and SRS, where such independence further enables flexible operation with different transmission and reception points in a wireless communication network. Notably, however, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of controlling Sounding Reference Signal (SRS) transmission power by a wireless device operating in a Long Term Evolution (LTE) network, said method implemented in a base station in the LTE network and comprising:
   generating SRS Transmit Power Control (TPC) commands for controlling a transmit power of SRS transmissions by the wireless device, and generating Physical Uplink Shared Channel (PUSCH) TPC commands or Physical Uplink Control Channel (PUCCH) TPC commands for controlling a transmit power of PUSCH or PUCCH transmissions by the wireless device;
   sending first TPC Downlink Control Information (DCI) messages to the wireless device that include the SRS TPC commands and that are masked by a first Radio Network Temporary Identifier (RNTI) and second TPC DCI messages to the wireless device that include the PUSCH or PUCCH TPC commands and are masked by the first RNTI; and
   controlling whether any given TPC DCI message that is masked with the first RNTI is interpreted by the wireless device as being one of the first TPC DCI messages or as being one of the second TPC DCI messages by sending the given TPC DCI message according to a first rule that is known to the wireless device or according to a second rule that is known to the wireless device.

2. The method of claim 1, wherein the second TPC DCI messages include the PUSCH TPC commands, such that any given TPC DCI message that is masked with the first RNTI controls the transmit power of SRS transmissions by the wireless device if the base station sends the given TPC DCI message according to the first rule, and controls the transmit power of PUSCH transmissions by wireless device if the base station sends the given TPC DCI message according to the second rule.

3. The method of claim 2, further comprising sending third TPC DCI messages to the wireless device that include the PUCCH TPC commands and that are masked with a second RNTI that is known to the wireless device as being allocated to PUCCH TPC, such that base station controls the transmit power of PUCCH transmissions by the wireless device by including PUCCH TPC commands in given TPC DCI messages that are masked with the second RNTI, controls the transmit power of SRS transmissions by the wireless device by including SRS TPC commands in given TPC DCI messages that are masked with the first RNTI and transmitted according to the first rule, and controls the transmit power of PUSCH transmissions by the wireless device by including PUSCH TPC commands in given TPC DCI messages that are masked with the first RNTI and transmitted according to the second rule.

4. The method of claim 1, wherein the first and second rules are defined in terms of which LTE subframes or frames are used to send a given TPC DCI message that is masked with the first RNTI.

5. The method of claim 1, wherein the first and second rules are defined or further defined in terms of which Physical Downlink Control Channel (PDCCH) or enhanced PDCCH (ePDCCH) allocations or configurations are used to send the given TPC DCI message.

6. The method of claim 1, wherein the first and second rules are defined or further defined in terms of whether the given TPC DCI message is sent from a common or device-specific search space in an enhanced Physical Downlink Control Channel (ePDCCH).

7. The method of claim 1, wherein the first and second rules are defined or further defined in terms of whether the given TPC DCI message is sent on a Physical Downlink Control Channel (PDCCH) or on an enhanced PDCCH (ePDCCH).

8. The method of claim 1, wherein the first and second rules are defined or further defined in terms of whether the given TPC DCI message is sent on an enhanced Physical Downlink Control Channel (ePDCCH) using localized or distributed transmission.

9. The method of claim 1, wherein the first and second rules are defined or further defined in terms of whether a DCI search space of the wireless device includes one or both of a Physical Downlink Control Channel (PDCCH) and an enhanced PDCCH (ePDCCH) transmission for the wireless device.

10. The method of claim 1, wherein the first and second rules are defined or further defined in terms of whether there is a Reference Signal (RS) symbol in a last OFDM symbol of a corresponding uplink subframe.

11. The method of claim 1, wherein the first and second rules are defined or further defined in terms of what states or conditions are taken on by carrier indicator field bits in the given TPC DCI message.

12. The method of claim 1, wherein the first rule is that a first defined subset of subframes as defined by the LTE air interface are used for transmission of the first TPC DCI messages and that one or more of the remaining subframes are used for transmission of the second TPC DCI messages, such that given TPC DCI messages masked with the first RNTI and sent in any of the subframes within the first defined subset are interpreted by the base station and the wireless device as given ones of the first TPC DCI messages for SRS TPC, and are otherwise interpreted as given ones of the second TPC DCI messages for PUSCH or PUCCH TPC.

13. The method of claim 1, further comprising separately controlling transmit powers of aperiodic and periodic SRS transmissions by the wireless device by generating the SRS TPC commands as first SRS TPC commands for controlling the periodic SRS transmissions by the wireless device and as second SRS TPC commands for controlling the aperiodic SRS transmissions by the wireless device, sending the first SRS TPC commands in the first TPC DCI messages, which are sent according to the first rule, and sending the second TPC commands in fourth DCI messages, which are masked with the first RNTI but which are sent according to a third rule known to the base station and to the wireless device, which third rule distinguishes the fourth TPC DCI messages from the first TPC DCI messages.

14. A base station configured for operation in a Long Term Evolution (LTE) network, said base station comprising:
communication transceiver circuits configured to transmit downlink signals to a wireless device operating in the LTE network and receive uplink signals from the wireless device; and
one or more processing circuits operatively associated with the communication transceiver circuits and configured to:
generate SRS Transmit Power Control (TPC) commands for controlling a transmit power of Sounding Reference Signal (SRS) transmissions by the wireless device, and generate Physical Uplink Shared Channel (PUSCH) or Physical Uplink Control Channel (PUCCH) TPC commands for controlling transmit powers of PUSCH or PUCCH transmissions by the wireless device;
send first TPC Downlink Control Information (DCI) messages to the wireless device that include the SRS TPC commands and that are masked by a first Radio Network Temporary Identifier (RNTI) and send second TPC DCI messages to the wireless device that include the PUSCH or PUCCH TPC commands and that are masked by the first RNTI; and
control whether the wireless device interprets any given TPC DCI message that is masked with the first RNTI as being one of the first TPC DCI messages for SRS TPC or as being one of the second TPC DCI message for PUSCH or PUCCH TPC, by sending the given TPC DCI message according to a first rule that is known to the wireless device or according to a second rule that is known to the wireless device.

15. The base station of claim 14, wherein the second TPC DCI messages include the PUSCH TPC commands, such that any given TPC DCI message that is masked with the first RNTI controls the transmit power of SRS transmissions by the wireless device if the given TPC DCI message is sent according to the first rule, and controls the transmit power of PUSCH transmissions by wireless device if the given TPC DCI message is sent according to the second rule.

16. The base station of claim 15, wherein the one or more processing circuits are configured to send third TPC DCI messages to the wireless device that include the PUCCH TPC commands and that are masked with a second RNTI that is known to the wireless device as being allocated to PUCCH TPC, such that the base station is configured to control the transmit power of PUCCH transmissions by the wireless device by including PUCCH TPC commands in given TPC DCI messages that are masked with the second RNTI, to control the transmit power of SRS transmissions by the wireless device by including SRS TPC commands in given TPC DCI messages that are masked with the first RNTI and transmitted according to the first rule, and to control the transmit power of PUSCH transmissions by the wireless device by including PUSCH TPC commands in given TPC DCI messages that are masked with the first RNTI and transmitted according to the second rule.

17. The base station of claim 14, wherein the one or more processing circuits include or are associated with a computer-readable medium storing a data structure defining the first and second rules in terms of at least one of the following distinctions:
which LTE subframes or frames are used to send a given TPC DCI message that is masked with the first RNTI;
which Physical Downlink Control Channel (PDCCH) or enhanced PDCCH (ePDCCH) allocations or configurations are used to send the given TPC DCI message;

whether the given TPC DCI message is sent from a common or device-specific search space in an ePDCCH;

whether the given TPC DCI message is sent on a PDCCH or an ePDCCH;

whether the given TPC DCI message is sent on an ePDCCH using localized or distributed transmission;

whether a DCI search space of the wireless device includes one or both of a PDCCH and an ePDCCH transmission for the wireless device;

whether there is a Reference Signal (RS) symbol in a last OFDM symbol of a corresponding uplink subframe; and what states or conditions are taken on by carrier indicator field bits in the given TPC DCI message.

18. The base station of claim 14, wherein the one or more processing circuits include or are associated with a computer-readable medium storing a data structure defining the first and second rules, and wherein the first rule is that a first defined subset of subframes as defined by the LTE air interface are used for transmission of the first TPC DCI messages and that one or more of the remaining subframes are used for transmission of the second TPC DCI messages, such that given TPC DCI messages masked with the first RNTI and sent in any of the subframes within the first defined subset are interpreted by the base station and the wireless device as given ones of the first TPC DCI messages for SRS TPC, and are otherwise interpreted as given ones of the second TPC DCI messages for PUSCH or PUCCH TPC.

19. The base station of claim 14, wherein the one or more processing circuits are configured to separately control transmit powers of aperiodic and periodic SRS transmissions by the wireless device, based on being configured to:

generate the SRS TPC commands as first SRS TPC commands for controlling the periodic SRS transmissions by the wireless device and as second SRS TPC commands for controlling the aperiodic SRS transmissions by the wireless device; and send the first SRS TPC commands in the first TPC DCI messages, which are sent according to the first rule, and send the second TPC commands in fourth DCI messages, which are masked with the first RNTI but which are sent according to a third rule known to the base station and to the wireless device, which the third rule distinguishes the fourth TPC DCI messages from the first TPC DCI messages.

20. A method at a wireless device configured for operation in a Long Term Evolution (LTE) network, said method comprising:

receiving Transmit Power Control (TPC) Downlink Control Information (DCI) messages from a base station in the LTE network, wherein the TPC DCI messages are masked by a first Radio Network Temporary Identifier (RNTI);

interpreting given ones of the TPC DCI messages as being first TPC DCI messages or as being second TPC DCI messages, based on whether the given TPC DCI messages were transmitted by the base station according to a first rule or according to a second rule, wherein the first and second rules are known to the base station and to the wireless device; and controlling a transmit power of Sounding Reference Signal (SRS) transmissions by the wireless device responsive to TPC commands conveyed in the first TPC DCI messages, and controlling a transmit power of Physical Uplink Shared Channel (PUSCH) or Physical Uplink Control Channel (PUCCH) transmissions by the wireless device responsive to TPC commands conveyed in the second TPC DCI messages.

21. The method of claim 20, wherein the second TPC DCI messages include PUSCH TPC commands, such that the method includes controlling the transmit power of the SRS transmissions responsive to the SRS TPC commands in the first TPC DCI messages, and controlling the transmit power of the PUSCH transmissions responsive to the PUSCH TPC commands in the second TPC DCI messages.

22. The method of claim 21, further comprising receiving additional TPC DCI messages to the wireless device that include PUCCH TPC commands and that are masked with a second RNTI that is known to the wireless device as being allocated to PUCCH TPC, interpreting the additional TPC DCI messages as third TPC DCI messages, and controlling a transmit power of PUCCH transmissions by the wireless device responsive to PUCCH TPC commands in the third TPC DCI messages.

23. The method of claim 20, wherein the first and second rules are defined in terms of which LTE subframes or frames are used to send a given TPC DCI message that is masked with the first RNTI.

24. The method of claim 20, wherein the first and second rules are defined or further defined in terms of which Physical Downlink Control Channel (PDCCH) or enhanced PDCCH (ePDCCH) allocations or configurations are used to send the given TPC DCI message.

25. The method of claim 20, wherein the first and second rules are defined or further defined in terms of whether the given TPC DCI message is sent from a common or device-specific search space in an enhanced Physical Downlink Control Channel (ePDCCH).

26. The method of claim 20, wherein the first and second rules are defined or further defined in terms of whether the given TPC DCI message is sent on a Physical Downlink Control Channel (PDCCH) or on an enhanced PDCCH (ePDCCH).

27. The method of claim 20, wherein the first and second rules are defined or further defined in terms of whether the given TPC DCI message is sent on an enhanced Physical Downlink Control Channel (ePDCCH) using localized or distributed transmission.

28. The method of claim 20, wherein the first and second rules are defined or further defined in terms of whether a DCI search space of the wireless device includes one or both of a Physical Downlink Control Channel (PDCCH) and an enhanced PDCCH (ePDCCH) transmission for the wireless device.

29. The method of claim 20, wherein the first and second rules are defined or further defined in terms of whether there is a Reference Signal (RS) symbol in a last OFDM symbol of a corresponding uplink subframe.

30. The method of claim 20, wherein the first and second rules are defined or further defined in terms of what states or conditions are taken on by carrier indicator field bits in the given TPC DCI message.

31. The method of claim 20, wherein the first rule is that a first defined subset of subframes as defined by the LTE air interface are used for transmission of the first TPC DCI messages and that one or more of the remaining subframes are used for transmission of the second TPC DCI messages, such that given TPC DCI messages masked with the first RNTI and sent in any of the subframes within the first defined subset are interpreted by the wireless device as given ones of the first TPC DCI messages for SRS TPC, and are otherwise interpreted as given ones of the second TPC DCI messages for PUSCH or PUCCH TPC.

32. The method of claim 20, further comprising separately controlling transmit powers of aperiodic and periodic SRS transmissions at the wireless device based on:
 interpreting given ones of the TPC DCI messages as being first or fourth DCI messages based on whether the base station sent the given TPC DCI messages according to the first rule or according to a third rule that is known to the wireless device; and
 controlling a transmit power of periodic SRS transmissions by the wireless device responsive to TPC commands conveyed in the first TPC DCI messages, and controlling a transmit power of aperiodic SRS transmissions by the wireless device responsive to TPC commands conveyed in the fourth TPC DCI messages.

33. A wireless device configured for operation in a Long Term Evolution (LTE) network, said wireless device comprising:
 communication transceiver circuits configured to receive downlink signals from a base station in the LTE network and to send uplink signals to the base station; and
 one or more processing circuits that are operatively associated with the communication transceiver circuits and configured to:
  receive Transmit Power Control (TPC) Downlink Control Information (DCI) messages from the base station, wherein the TPC DCI messages are masked by a first Radio Network Temporary Identifier (RNTI);
  interpret given ones of the TPC DCI messages as being first TPC DCI messages or as being second TPC DCI messages, based on whether the given TPC DCI messages were transmitted by the base station according to a first rule or according to a second rule, wherein the first and second rules are known to the base station and to the wireless device; and
  control a transmit power of Sounding Reference Signal (SRS) transmissions by the wireless device responsive to TPC commands conveyed in the first TPC DCI messages, and control a transmit power of Physical Uplink Shared Channel (PUSCH) or Physical Uplink Control Channel (PUCCH) transmissions by the wireless device responsive to TPC commands conveyed in the second TPC DCI messages.

34. The wireless device of claim 33, wherein the second TPC DCI messages include PUSCH TPC commands, and wherein the one or more processing circuits are configured to control the transmit power of the SRS transmissions responsive to the SRS TPC commands in the first TPC DCI messages, and to control the transmit power of the PUSCH transmissions responsive to the PUSCH TPC commands in the second TPC DCI messages.

35. The wireless device of claim 34, wherein the one or more processing circuits are configured to receive additional TPC DCI messages that include PUCCH TPC commands and that are masked with a second RNTI that is known to the wireless device as being allocated to PUCCH TPC, interpret the additional TPC DCI messages as third TPC DCI messages, and control a transmit power of PUCCH transmissions by the wireless device responsive to PUCCH TPC commands in the third TPC DCI messages.

36. The wireless device of claim 33, wherein the first and second rules are defined in terms of at least one of the following distinctions:
 which LTE subframes or frames are used to send a given TPC DCI message that is masked with the first RNTI;
 which Physical Downlink Control Channel (PDCCH) or enhanced PDCCH (ePDCCH) allocations or configurations are used to send the given TPC DCI message;
 whether the given TPC DCI message is sent from a common or a device-specific search space in an ePDCCH;
 whether the given TPC DCI message is sent on a PDCCH or on an ePDCCH;
 whether the given TPC DCI message is sent on an ePDCCH using a localized or distributed transmission;
 whether a DCI search space of the wireless device includes one or both of a PDCCH and an ePDCCH transmission for the wireless device;
 whether there is a RS symbol in a last OFDM symbol of a corresponding uplink subframe; and
 what states or conditions are taken on by carrier indicator field bits in the given TPC DCI message.

37. The wireless device of claim 33, wherein the first rule is that a first defined subset of subframes as defined by the LTE air interface are used for transmission of the first TPC DCI messages and that one or more of the remaining subframes are used for transmission of the second TPC DCI messages, such that given TPC DCI messages masked with the first RNTI and sent in any of the subframes within the first defined subset are interpreted by the wireless device as given ones of the first TPC DCI messages for SRS TPC, and are otherwise interpreted as given ones of the second TPC DCI messages for PUSCH or PUCCH TPC.

38. The wireless device of claim 33, wherein the one or more processing circuits are configured to separately control transmit powers of aperiodic and periodic SRS transmissions at the wireless device based on:
 interpreting given ones of the TPC DCI messages as being first or fourth DCI messages based on whether the base station sent the given TPC DCI messages according to the first rule or according to a third rule that is known to the wireless device; and
 controlling a transmit power of periodic SRS transmissions by the wireless device responsive to TPC commands conveyed in the first TPC DCI messages, and controlling a transmit power of aperiodic SRS transmissions by the wireless device responsive to TPC commands conveyed in the fourth TPC DCI messages.

* * * * *